United States Patent [19]

Overzet

[11] 4,437,050

[45] Mar. 13, 1984

[54] STABILIZING CIRCUIT FOR CONTROLLED INVERTER-MOTOR SYSTEM

[75] Inventor: John K. Overzet, Elmhurst, Ill.

[73] Assignee: Borg-Warner Corporation, Chicago, Ill.

[21] Appl. No.: 445,647

[22] Filed: Nov. 30, 1982

Related U.S. Application Data

[63] Continuation of Ser. No. 189,445, Sep. 22, 1980, abandoned.

[51] Int. Cl.$^3$ .............................................. H02P 7/42
[52] U.S. Cl. ..................................... 318/798; 318/803; 318/807
[58] Field of Search ........................ 318/798, 801–803, 318/805, 807, 810, 811

[56] References Cited

U.S. PATENT DOCUMENTS

| | | | |
|---|---|---|---|
| 3,546,551 | 12/1970 | Risberg et al. | 318/227 |
| 4,158,163 | 6/1979 | Eriksen et al. | 318/798 |
| 4,274,042 | 6/1981 | Walker et al. | 318/798 X |
| 4,280,085 | 7/1981 | Cutler et al. | 318/798 X |
| 4,281,276 | 7/1981 | Cutler et al. | 318/803 |
| 4,291,264 | 9/1981 | Siemon | 318/798 X |

OTHER PUBLICATIONS

"Volts/Hertz Control–Induction Machines"–K. Fukazawa et al., 1 AS 1981 IEEE pp. 619–627.

Primary Examiner—G. Z. Rubinson
Assistant Examiner—Richard M. Moose
Attorney, Agent, or Firm—James E. Tracy

[57] ABSTRACT

Stabilized operation of an inverter and an a-c motor, driven by the inverter, is obtained in the presence of sudden undesired load changes by controlling the inverter so that both the amplitude and frequency of the inverter output a-c voltage will be functions of, and will vary directly with, the d-c bus voltage, with the result that anytime an abrupt abnormal load change causes the d-c bus voltage to vary, a frequency change occurs to compensate for the load change and to stabilize the bus voltage. By employing the d-c bus voltage to regulate the inverter frequency, if there is a sudden decrease, for example, in the mechanical load on the motor, the d-c bus voltage, which will tend to increase, causes the frequency of the inverter output voltage to increase, thereby increasing the motor speed so that the electrical load change across the d-c bus is reduced. As a result, the d-c bus voltage tends to remain relatively constant in spite of the abrupt mechanical load change. When there is a normal variation in load demand, necessitating a different steady state motor speed, a set point or reference voltage may be adjusted to change the amplitude and frequency of the inverter output voltage to the levels needed to drive the motor at the new required speed.

5 Claims, 3 Drawing Figures

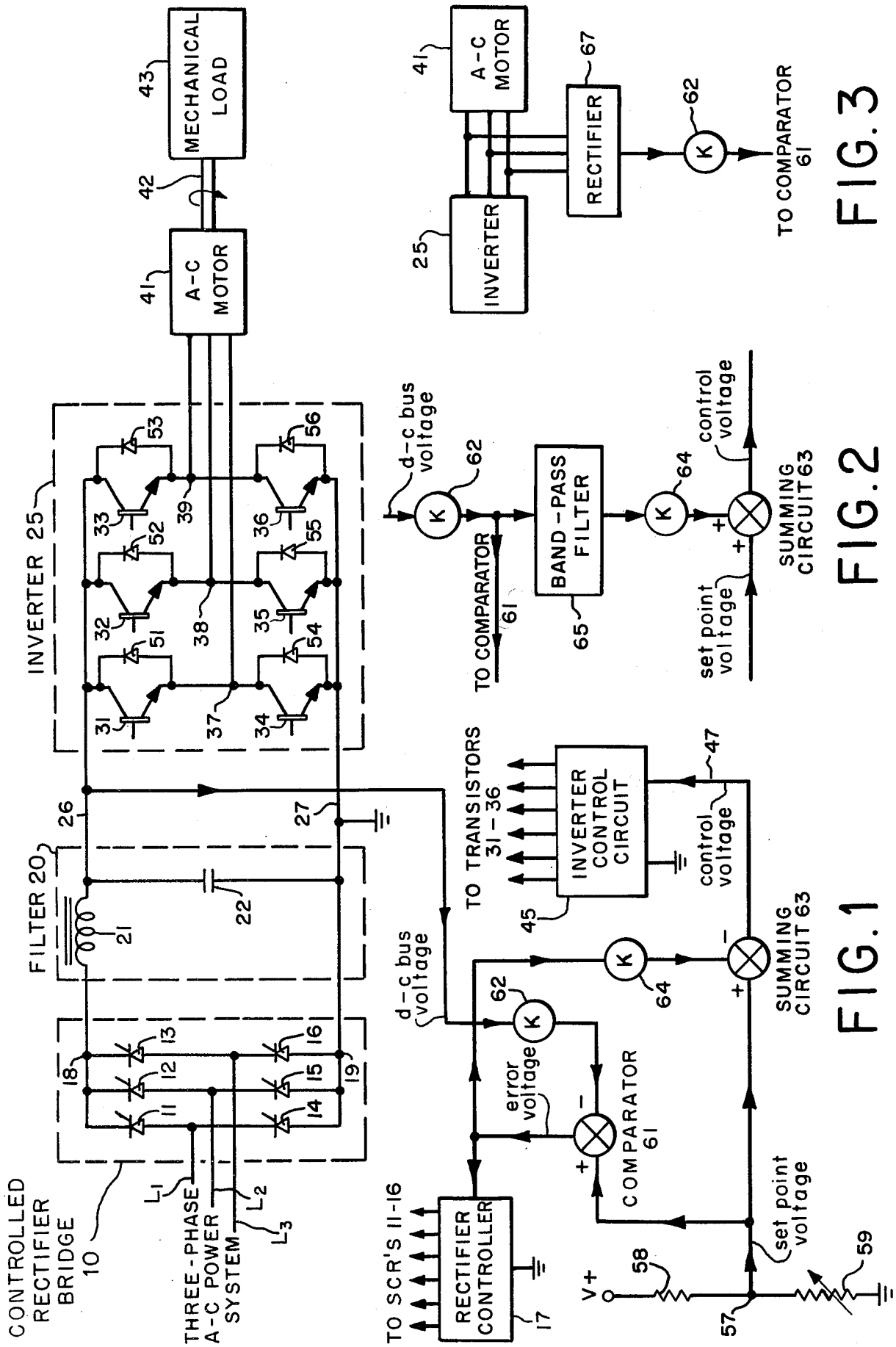

STABILIZING CIRCUIT FOR CONTROLLED INVERTER-MOTOR SYSTEM

This is a continuation, of application Ser. No. 189,445 filed Sept. 22, 1980, now abandoned.

BACKGROUND OF THE INVENTION

This invention relates to a control system for stabilizing the operation of an inverter-motor system during transients or disturbances, thereby greatly improving its dynamic behavior, and during steady state when the operating conditions are appropriate to cause system oscillation.

Inverter-motor systems have a tendency to oscillate at low frequencies under certain operating conditions, at which time the inverter appears as a negative resistance to the d-c bus over which the inverter receives its energizing voltage. This invention serves to make the inverter appear as a more positive resistance, thus reducing the tendency to oscillate.

In addition, the inverter-motor systems may have load torques which change abruptly, causing significant deviations from the desired steady state d-c bus voltage. This invention also serves to reduce the effect that the sudden load torque change has on the d-c bus voltage, thereby reducing the deviations from the desired d-c bus voltage.

The cause of the undesired bus voltage change is attributable to the presence of the filter, comprising a series-connected choke and a shunt-connected capacitor, which is usually included in the d-c power supply that produces the bus voltage. During normal steady state operation no average current flows to the filter capacitor and all of the current flows to the inverter and then to the motor windings. If there is a sudden drop, for example, in the load torque on the motor, the motor current abruptly decreases and the inductor current flows into the filter capacitor, charging it to a considerably higher voltage. Since the d-c bus is coupled across the capacitor, the bus voltage likewise increases significantly. The high bus voltage, in addition to deleteriously affecting the operation of the motor, may also destroy the switching devices (which may be transistors) in the inverter. To prevent such destruction, oversized switching devices are customarily employed having performance characteristics sufficient to withstand the highest bus voltage that could occur in the event of a very sudden load change.

The control system of the present invention achieves significantly improved dynamic performance and overcomes the instability problem by effectively regulating the d-c bus voltage to provide motor stability, while at the same time avoiding the necessity of oversizing the switching devices. With the present invention, the negative resistance of the inverter is made more positive to eliminate the tendency to oscillate. At the same time, the invention effects the way the motor torque changes with time to reduce the d-c bus voltage deviation from the desired value.

SUMMARY OF THE INVENTION

The control system of the invention controls the operation of an a-c motor driven by the output a-c voltage from an inverter which in turn is energized by an adjustable d-c bus voltage received over a d-c bus from a controlled d-c power supply. The control system comprises means for providing a set point voltage representing a desired amplitude and a desired frequency for the a-c voltage produced by the inverter. There are means for utilizing the set point voltage to establish the inverter output voltage at the desired amplitude and to establish the frequency of the inverter output voltage at the desired level. Stabilizing means, which respond to an undesired change in the d-c bus voltage, are provided for varying the inverter frequency to control the electrical load across the d-c bus to maintain the bus voltage relatively constant.

DESCRIPTION OF THE DRAWING

The features of the invention which are believed to be novel are set forth with particularity in the appended claims. The invention, together with further advantages and features thereof, may best be understood, however, by reference to the following description in conjunction with the accompanying drawing in which:

FIG. 1 schematically illustrates a control system, constructed in accordance with one embodiment of the present invention, and the manner in which that control system is coupled to an inverter-motor system to control and to stabilize the operation thereof; and FIGS. 2 and 3 show portions of the control system of FIG. 1 modified in accordance with two other embodiments of the invention.

DESCRIPTION OF THE ILLUSTRATED EMBODIMENTS

Referring to FIG. 1, line conductors $L_1$, $L_2$ and $L_3$ connect to a conventional three-phase a-c power system and thus provide three-phase a-c voltage, namely three alternating voltages that are phase-displaced with respect to each other by 120° and have a frequency of 60 hertz. Each of the three phase voltages is a line-to-line voltage and appears on one of the line conductors $L_1$, $L_2$ and $L_3$ relative to another one of the line conductors. The a-c energy received over the line conductors is converted to d-c power by a controlled rectifier bridge 10 which is of well-known construction. Specifically, the bridge has a family of six silicon controlled rectifiers or SCR's 11–16 which, when fired into conduction by gate current from rectifier controller 17, rectify the applied a-c voltage and develop across the bridge's positive and negative output terminals (designated 18 and 19, respectively) rectified voltage of a magnitude determined by the conduction angles of the SCR's during each half cycle of the applied a-c voltage.

To explain, each SCR in bridge 10 can conduct, during each positive polarity half cycle of the voltage applied thereto from the a-c power system, when the SCR's anode is positive relative to its cathode. However, conduction will not occur during a positive half cycle until gate current is supplied to the SCR's gate from rectifier controller 17. At that instant, the SCR fires into conduction, or turns on, and permits load current to flow therethrough until the end of the positive half cycle. The greater the phase angle or time delay between the start of a positive half cycle and the firing of the SCR into conduction, the less the conduction angle and the less average voltage will be rectified and supplied to the load. Of course, the rectified voltage will be of positive polarity at terminal 18 with respect to terminal 19.

A filter 20 comprising series-connected choke 21 and shunt-connected capacitor 22 filter the rectified voltage from the bridge to develop a filtered d-c voltage for application to inverter 25 over the d-c bus provided by lines 26 and 27. A positive-polarity d-c bus voltage will therefore appear on line 26 with respect to line 27 which is connected to a ground plane of reference potential or circuit common, zero volts in the illustrated embodiment. By controlling the conduction angles of SCR's 11–16 the d-c bus voltage applied to inverter 25, via bus 26, 27, is controlled.

Inverter 25 has a well-known circuit configuration. It includes three pairs of NPN bipolar power transistors 31–36, each pair being series-connected across the d-c bus 26, 27. The circuit junctions 37, 38 and 39 of the three transistor pairs cannect to the windings of a-c induction motor 41, whose output shaft 42 drives some mechanical load 43. By supplying drive current to the bases of the six bipolar transistors 31–36 at prescribed times, the d-c voltage across the d-c bus is effectively changed to a-c voltage as applied to the windings of the motor, thereby delivering alternating current to the windings to effect rotation of motor 41 at a speed determined by and directly proportional to the frequency of the inverter output a-c voltage. For example, if base drive current is simultaneously supplied to transistors 31 and 35 to drive those transistors into their saturation modes, current will flow from line 26 and through, in the order named, the emitter-collector conduction path of transistor 31, junction 37, a winding of motor 41, junction 38 and the emitter-collector conduction path of transistor 35 to line 27 or ground. If transistors 31 and 35 are then cut off and transistors 32 and 34 are turned on instead, current will flow through the same motor winding in the opposite direction. Of course, control circuitry for supplying base drive current to switch the transistors 31–36 on and off in the correct sequence, at the correct times and at the correct frequency in order to provide the required a-c energy for rotating motor 41 and driving load 43 in the desired manner is well understood by those skilled in the art. In the illustrated embodiment this control circuitry is shown by the block 45 labelled "inverter control circuit". Usually, such a control circuit will include logic circuitry and a controlled oscillator which, in response to a control voltage received over line 47, supplies programmed periodically recurring timing pulses, or base drive signals, to transistors 31–36 to establish the frequency of the inverter output voltage and consequently the speed of motor 41. The pulse repetition frequency of the timing pulses will be a function of the control voltage on line 47. Hence, the inverter frequency is controlled by varying the magnitude of that control voltage.

The emitter-collector conduction path of each of the six power transistors 31–36 is shunted by a respective one of a series of six oppositely poled feedback diodes 51–56 which are employed to circulate the motor reactive current back to filter capacitor 22. Feedback diodes 51–56 are also effective to clamp the motor terminal voltage so that it will never exceed the d-c bus voltage.

Although not shown in the drawing, preferably each of transistors 31–36 will also be shunted by a conventional snubber network to prevent the inductive energy in the motor windings from damaging the transistors when they are switched off by inverter control circuit 45 during normal operation.

While each of power bipolar transistors 31–36 is illustrated as a conventional NPN transistor (to simplify the drawing), in reality it would preferably take the form of a well-known power darlington transistor. In the darlington arrangement, each of transistors 31–36 comprises a combination of two transistors, while still having only three connections, namely base, emitter and collector connections as is the case in the drawing. Of course, while power bipolar transistors are shown as the switching devices, other devices can be used such as thyristors, field effect transistors, etc.

To control the operation of rectifier controller 17 in order to adjust the amplitude of the inverter output a-c voltage and to control the operation of control circuit 45 to regulate the frequency of the inverter voltage, an adjustable set point or reference d-c voltage is provided at the junction 57 of fixed resistor 58 and adjustable resistor 59. As will be made apparent, the set point voltage from voltage divider 58, 59 determines the steady state operating conditions and represents a desired amplitude and a desired frequency for the a-c voltage produced by inverter 25 for application to motor 41. Preferably, the set point will be selected to satisfy the speed demanded by mechanical load 43. Comparator 61 compares the set point voltage with a voltage proportional to the d-c bus voltage (due to the presence of gain factor K62) to provide an error voltage which is a function of the difference between the compared voltages. K62 sets the gain between the d-c bus voltage and the set point voltage. Rectifier controller 17 responds to the error voltage to produce properly timed gate current pulses for application to the gates of SCR's 11–16 to control the conduction angles of the SCR's as required to establish the d-c bus voltage across lines 26 and 27 at the magnitude necessary to establish and to maintain the inverter output voltage at the desired amplitude. If the d-c bus voltage tends to vary from the requisite steady state level, the error voltage changes and causes rectifier controller 17 to vary the conduction angles as necessary to adjust the d-c bus voltage until the correct steady state amplitude level is re-established.

In the meantime, the control voltage for regulating the operation of control circuit 45 is developed by adding, in summing circuit 63, the set point voltage and a voltage proportional to the error voltage. K64 represents a transfer function and indicates the gain in the feedback loop. The value of K64 is selected for best system performance. Too low a value will defeat the positive feature of the control system, whereas too high a value for K64 can cause instability. The control voltage will thus be a function of the error voltage and the set point voltage, as a result of which the programmed timing or base drive signals supplied to transistors 31–36 will have the frequency required to set the frequency of the inverter output voltage at the desired steady state level. Since both the amplitude and frequency of the inverter output voltage are determined by the set point voltage, those two characteristics of the inverter voltage will have a fixed ratio with respect to each other when no error voltage is present. This steady state ratio can be set by gain factor 62. A fixed ratio is desirable in order to avoid overheating of motor 41 and to provide the motor with a constant torque output capability regardless of motor speed.

When there is a normal variation in load demand, thereby dictating a different steady state motor speed, resistor 59 may be adjusted to vary the set point voltage to the extent necessary to change the control voltage as required to establish the frequency of the inverter voltage at the level necessary to drive motor 41 at the new desired speed. At the same time, the new set point voltage varies the d-c bus voltage as needed to maintain the same fixed ratio of the amplitude and frequency characteristics of the inverter output voltage.

Of course, while the motor speed may be changed by manually adjusting resistor 59, the set point voltage may be derived by sensing some parameter or characteristic of the system, in which the controlled inverter-motor sysem is incorporated, in order to automatically control the motor speed in response to that sensed information.

It is also to be recognized that the d-c power supply (namely rectifier bridge 10 and filter 20) may operate in response to single-phase rather than three-phase a-c energy. In the single-phase environment, line conductor $L_3$ and SCR's 13 and 16 would be omitted. Of course, a d-c bus voltage of positive polarity will still be produced on line 26 with respect to line 27. It should also be appreciated that the constructions of the d-c power supply and the inverter may take a variety of different forms. For example, the controlled d-c bus could be provided by a DC-DC converter supplied by a d-c bus.

In the event that the mechanical load on motor 41 undergoes a sudden change, in the absence of the disclosed stabilizing circuit the d-c bus voltage would change. To explain, assume that the load torque on motor 41 is abruptly decreased, or removed entirely, causing sharply decreased average d-c bus current to the inverter. The filter choke current thereupon flows into filter capacitor 22 to charge that capacitor to a voltage significantly higher than the desired d-c bus voltage. The tendency of the bus voltage to increase will be compensated, however, by the present invention by increasing the motor speed in response to increasing bus voltage so that the inverter-motor system will not be deleteriously affected and stable operation will ensue. In effect, the invention operates to maintain, in the presence of sudden abnormal mechanical load changes on motor 41, an electrical load across d-c bus 26, 27 which causes the d-c bus voltage to tend to remain relatively fixed.

This immunization to abrupt or transient load torque changes is obtained by controlling the inverter frequency so that it is a function of, and will vary directly with, the d-c bus voltage. If the bus voltage tends to increase, as the load torque drops, the error voltage will increase and cause the control voltage to increase, whereupon inverter control circuit 45 will effect an increase in the frequency of the inverter output voltage. As a consequence, the motor speed increases and this effectively increases the electrical load on the d-c bus to compensate for the decreased electrical load which occurred when the mechanical load decreased. In short, the motor is accelerated anytime the mechanical load drops, thereby presenting a reduced change in electrical load to the d-c bus. The error voltage is then decreased to zero by the d-c bus regulating circuit and the system is once again operative at the frequency and voltage called for by the set point voltage. The gain for the ratio of the transient change or deviation in the bus voltage relative to the resulting frequency deviation for the inverter will be adjusted by gain factor K64 and can be adjusted differently than, and independently from, the steady state gain factor 62.

Of course, if motor 41 experiences a sudden increase in load torque resulting in an increased electrical load and a reduced d-c bus voltage, the error voltage will drop and cause the inverter frequency and motor speed to decrease so that the electrical load on the d-c bus will drop and the bus voltage will increase.

To summarize the operation of the invention as embodied in FIG. 1, under normal steady state conditions rectifier controller 17 serves to reduce the error voltage to zero. The d-c bus voltage then is related to the set point voltage by the gain factor K62. At that time, the control voltage, which determines the inverter frequency, is equal to the set point voltage. Hence, the ratio of d-c bus voltage to inverter frequency can be adjusted by K62. Under transient conditions, the error voltage will not be zero. Gain factor K64 determines the amount of control voltage deviation from the set point that will occur for a given error voltage. As a consequence, K64 determines the magnitude of the frequency deviation from the steady state frequency value that will occur under transient conditions. The ratio of the d-c bus voltage deviation from the desired steady state value to the deviation of the inverter frequency from the desired steady state value is, therefore, adjusted by gain factor K64. As a result, the ratio of steady state d-c bus voltage to inverter frequency can be set independently of the ratio of d-c bus voltage deviation to inverter frequency deviation under transient conditions.

It should be understood that the invention may be practiced in a variety of different manners in order to cause a deviation of the frequency control voltage proportional to the deviation of the d-c bus voltage from its desired value. In the FIG. 1 embodiment, transient bus voltage changes result in transient error voltage changes which are then used to vary the inverter frequency. The stabilizing means of the invention can, of course, respond directly to a transient variation in the d-c bus voltage. This is shown in the embodiment of FIG. 2. There, the feedback loop from the d-c bus to the inverter excludes the comparator 61, unlike the case in FIG. 1. Also, in accordance with the FIG. 2 embodiment, K64 is preceded by a band-pass filter 65 to remove any steady state effect of the control system. With such a filter, the stabilizing circuit will respond only to transient bus voltage changes. In other words, for normal operation when the inverter-motor system is operated at different steady state conditions, no voltage is applied, through filter 65, to summing circuit 63 and the inverter frequency is established entirely by the set point voltage. However, when the bus voltage experiences an undesired transient change, that change will pass through filter 65 to summing circuit 63. In effect, summing circuit 63 is made unresponsive to relatively slow changes in the bus voltage but responsive to relatively fast changes. The control voltage, produced by the summing circuit, will therefore be varied and the inverter frequency will be altered, in accordance with the invention, to compensate for the sudden bus voltage change.

Of course, any transient change in the d-c bus voltage will also appear as a transient change in the motor voltage or the inverter output voltage, which are essentially the same. Hence, the invention may be practiced by providing a feedback loop from a-c motor 41 to the inverter 25 for adjusting the inverter frequency in response to transient changes in the inverter output voltage. This is shown in the embodiment of FIG. 3. The three-phase voltage produced by inverter 25 is rectified by rectifier 67 to develop a d-c voltage which will have substantially the same magnitude as the d-c bus voltage applied to the inverter. Moreover, any transient change in the d-c bus voltage will manifest itself as a transient change in the d-c output voltage of rectifier 67. Hence, such a d-c voltage may be applied to comparator 61 and the system will operate substantially the same as described in connection with FIG. 1.

It is thus apparent that the present invention not only stabilizes the operation of an inverter-motor system, but by preventing the d-c bus voltage from increasing, in response to a sudden drop in load torque, the transistors in the inverter need not be oversized.

While a particular embodiment of the invention has been shown and described, modifications may be made, and it is intended in the appended claims to cover all such modifications as may fall within the true spirit and scope of the invention.

I claim:

1. A control system for controlling and stabilizing the operation of an a-c motor driven by the output a-c voltage developed by an inverter from an adjustable d-c bus voltage received over a d-c bus from a controlled d-c power supply, the d-c bus voltage being subject to undesired variations under changing conditions, said control system comprising:

means for providing a set point voltage representing a desired steady state amplitude and a desired steady state frequency for the a-c voltage produced by the inverter;

first utilizing means for utilizing the set point voltage to adjust the d-c bus voltage to establish the inverter output voltage at the desired steady state amplitude, and including a frequency insensitive feedback circuit, having a predetermined first gain factor, from the d-c bus for determining the ratio of steady state d-c bus voltage to steady state inverter frequency;

second utilizing means for utilizing the set point voltage to establish the frequency of the inverter output voltage at the desired steady state level; and stabilizing means, including a frequency insensitive circuit having a predetermined second gain factor, responsive to a deviation in the d-c bus voltage from the desired steady state amplitude for varying the inverter frequency to change the electrical load across the d-c bus to maintain the bus voltage constant under changing conditions, the second gain factor determining the ratio of d-c bus voltage deviation to inverter frequency deviation under changing conditions, thereby permitting the employment of different ratios for steady state and changing conditions.

2. A control system according to claim 1 wherein said first utilizing means includes means for comparing the set point voltage with a voltage proportional to the d-c bus voltage to produce an error voltage having amplitude changes which reflect changes in the d-c bus voltage from the desired steady state amplitude and which error voltage is used during steady state conditions to adjust the bus voltage as necessary to maintain it at the desired steady state amplitude, and wherein said stabilizing means responds to changes in the error voltage to vary the inverter frequency as required to hold the bus voltage constant under changing conditions.

3. A control system according to claim 2 wherein a summing circuit adds the set point voltage and a voltage proportional to the error voltage to produce a control voltage for controlling the inverter frequency, the error voltage being zero during steady state as a result of which the control voltage equals the set point voltage under steady state conditions.

4. A control system according to claim 3 wherein the frequency of the inverter output a-c voltage is determined by the frequency of timing pulses applied to the inverter, wherein a controller, operated in response to the error voltage, controls the d-c power supply to adjust the d-c bus voltage to the level required to establish the inverter output voltage at the desired steady state amplitude, wherein summing means adds the set point voltage and a voltage proportional to the error voltage to provide a control voltage, and wherein an inverter control circuit operates in response to the control voltage to supply periodically recurring timing pulses to the inverter to establish the inverter output voltage at the desired steady state frequency thereby setting the motor speed at a desired level, changes in the error voltage, caused by variations in the bus voltage during changing conditions, effecting changes in the frequency of the timing pulses to vary the inverter frequency with, and in the same direction as, the d-c bus voltage.

5. A control system for controlling and stabilizing the operation of an a-c motor driven by the output a-c voltage developed by an inverter from an adjustable d-c bus voltage received over a d-c bus from a controlled d-c power supply, the inverter output a-c voltage being subject to undesired variations under changing conditions, said control system comprising:

means for providing a set point voltage representing a desired steady state amplitude and a desired steady state frequency for the a-c voltage produced by the inverter;

first utilizing means for utilizing the set point voltage to adjust the d-c bus voltage to establish the inverter output voltage at the desired steady state amplitude, and including a frequency insensitive feedback circuit, having a predetermined first gain factor, from the output of the inverter for determining the ratio of steady state inverter output voltage to steady state inverter frequency;

second utilizing means for utilizing the set point voltage to establish the frequency of the inverter ouput voltage at the desired steady state level; and stabilizing means, including a frequency insensitive circuit having a predetermined second gain factor, responsive to a deviation in the inverter output voltage from the desired steady state amplitude for varying the inverter frequency to change the electrical load across the d-c bus to maintain the inverter output voltage constant under changing conditions, the second gain factor determining the ratio of inverter output voltage deviation to inverter frequency deviation under changing conditions, thereby permitting the employment of different ratios for steady state and changing conditions.

* * * * *